(12) United States Patent
Soberanis

(10) Patent No.: US 7,231,868 B2
(45) Date of Patent: Jun. 19, 2007

(54) WINE POMACE EXTRACTION APPARATUS AND METHOD

(76) Inventor: David L. Soberanis, 480 Feliz Rd., Hopland, CA (US) 95449

( * ) Notice: Subject to any disclaimer, the term of this patent is extended or adjusted under 35 U.S.C. 154(b) by 217 days.

(21) Appl. No.: 10/628,527

(22) Filed: Jul. 27, 2003

(65) Prior Publication Data
US 2005/0016393 A1    Jan. 27, 2005

(51) Int. Cl.
*B65G 65/48* (2006.01)
(52) U.S. Cl. .......................... 99/276; 99/277; 414/308; 414/314; 414/318; 414/327; 198/550.12; 198/550.11; 15/93.1; 134/166 R
(58) Field of Classification Search ............... 99/277.1, 99/277.2, 276, 277; 414/306, 308, 314, 311, 414/318, 321, 327; 15/3, 93.2, 93.1; 134/166 R; 198/550.1, 550.12, 550.11
See application file for complete search history.

(56) References Cited

U.S. PATENT DOCUMENTS

| | | | | |
|---|---|---|---|---|
| 1,165,760 A | * | 12/1915 | Craine | ...................... 198/550.4 |
| 2,930,498 A | * | 3/1960 | Felbeck | ...................... 414/308 |
| 3,035,718 A | * | 5/1962 | Behlen | ...................... 414/306 |
| 3,515,260 A | * | 6/1970 | Clyne | ......................... 198/499 |
| 4,198,186 A | * | 4/1980 | Holdren et al. | ............. 414/308 |
| 5,318,444 A | * | 6/1994 | Kuzub et al. | ............... 414/326 |

\* cited by examiner

*Primary Examiner*—Reginald L. Alexander
(74) *Attorney, Agent, or Firm*—Gary Hoenig

(57) ABSTRACT

The present invention relates to an apparatus and method for wine pomace extraction from wine processing tanks in a manner so as to minimize maceration of the wine pomace so as not to taint wine entrained within the pomace. In the present invention, wine pomace is mechanically transported out the processing tank by a conveyor means. Wine pomace is guided into the collecting path of the conveyor means by a mechanical sweeper attached to the conveyor means. In a preferred embodiment, a conveyor with sweeper wing attachments is mounted on a portable cart. The invention is positioned into the processing tank through an entry portal and secured to a tank containing pomace. The conveyor transports pomace to a receiver bin until the majority of pomace is extracted. Sweeper wings are deployed to guide remaining pomace into the collecting path of the conveyor.

13 Claims, 12 Drawing Sheets

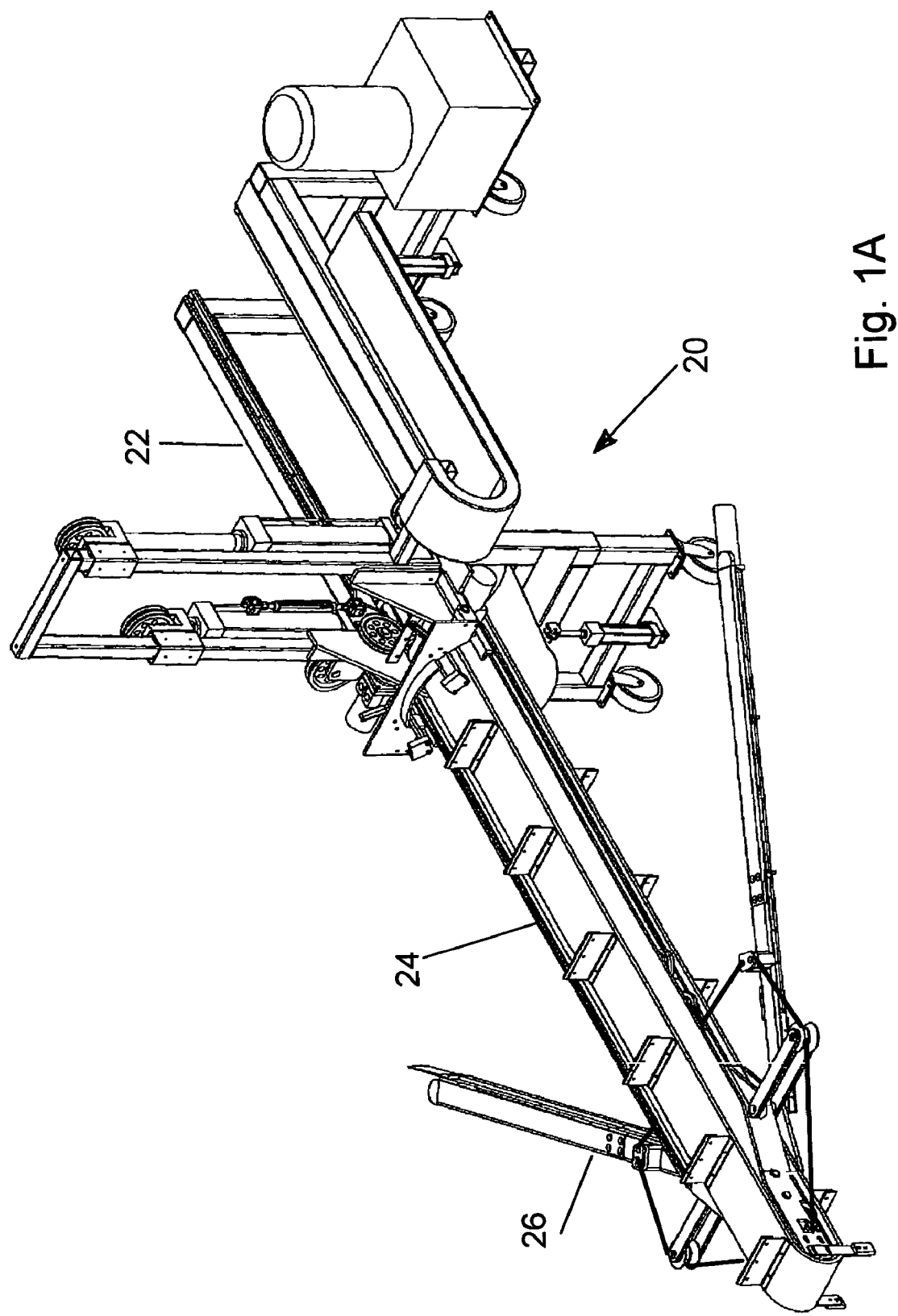

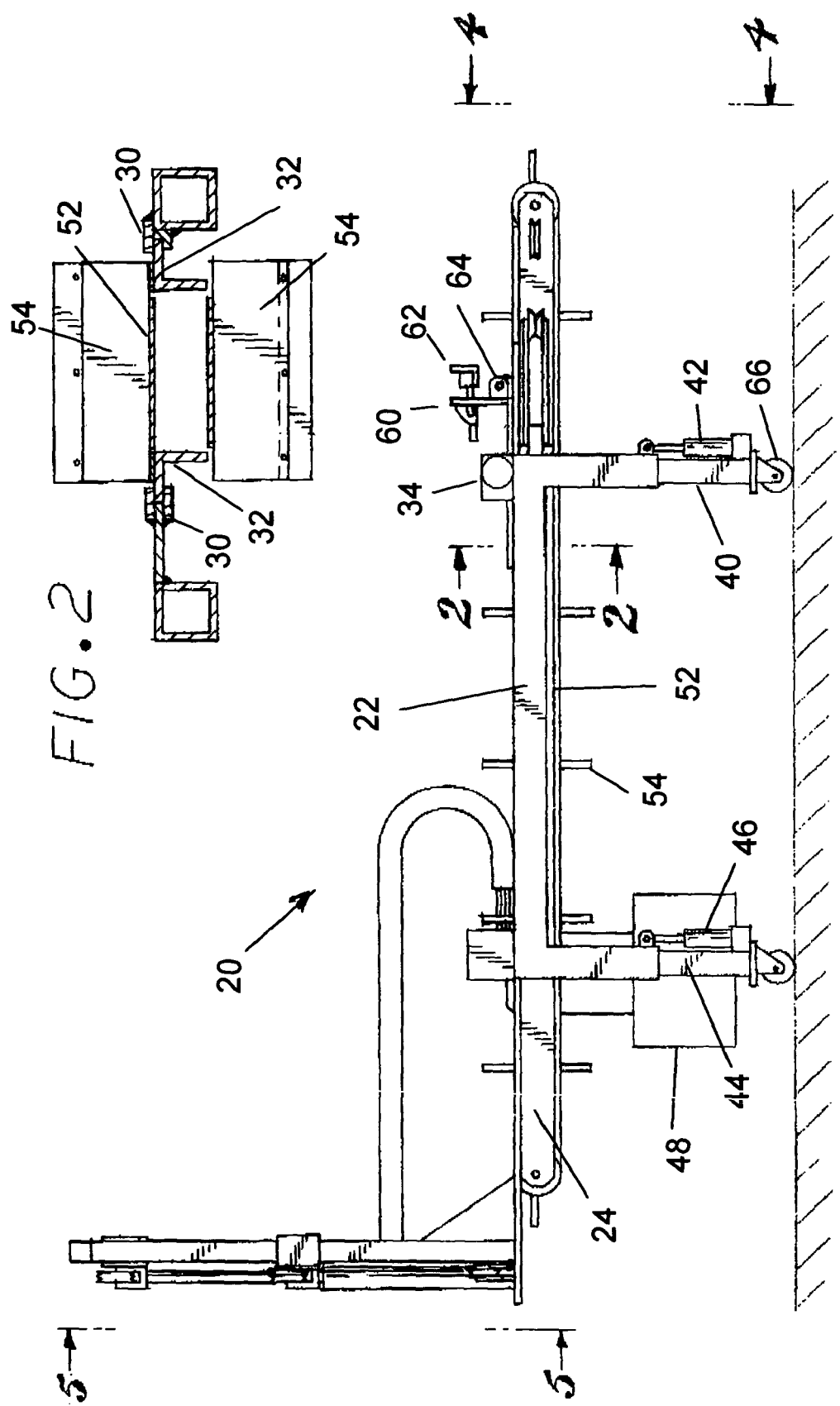

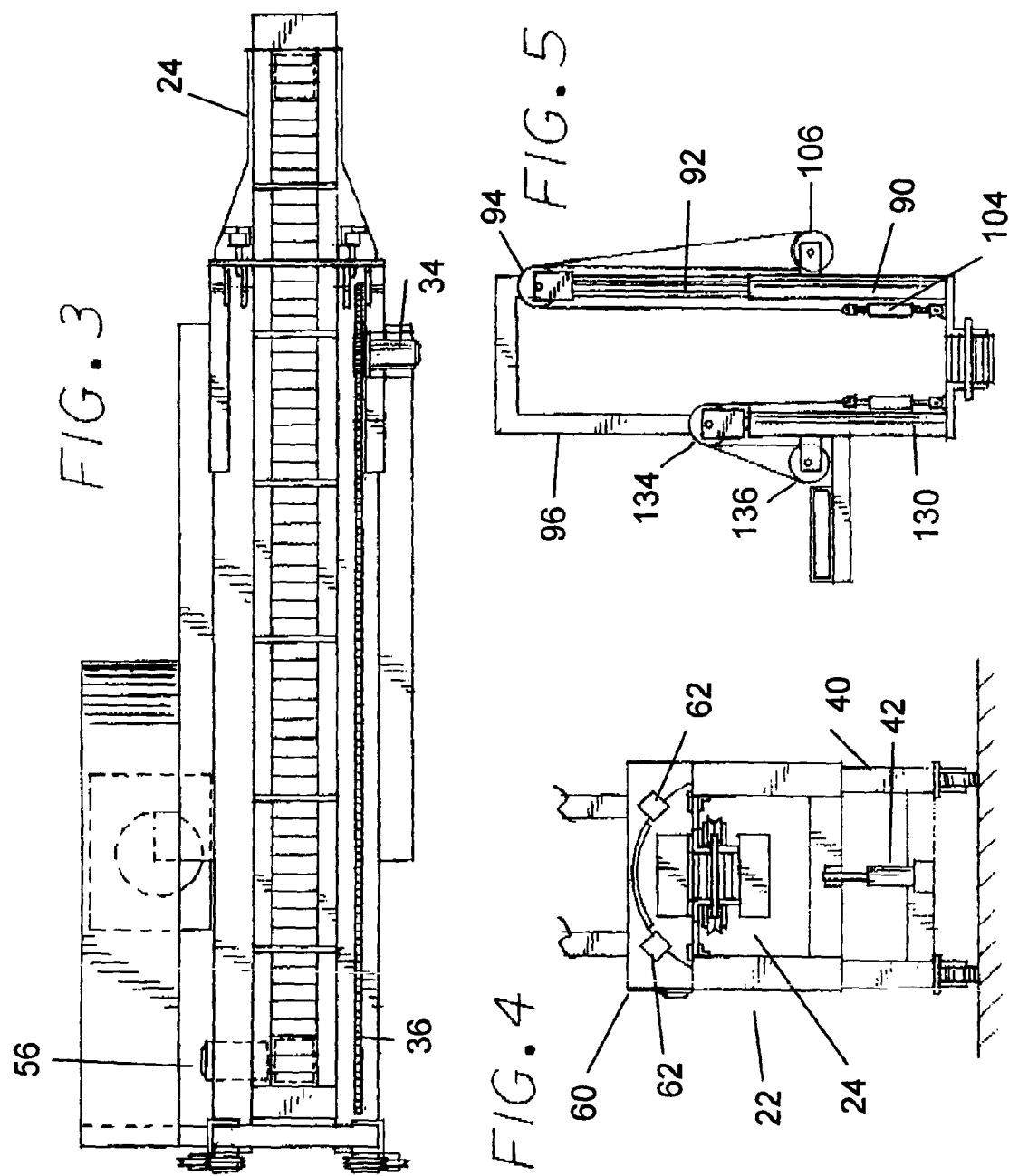

WINE POMACE EXTRACTION APPARATUS AND METHOD

BACKGROUND OF THE INVENTION

The present invention relates to the wine making industry and to the removal of the residue of wine fermentation remaining in a processing tank after the fermented wine is removed. More particularly, to an apparatus and method for the automated removal of the remainder of grape skins, stems and other material, generally referred to as pomace, from the fermentation tank after the completion of fermentation, wherein the method of removal of the wine pomace minimizes the maceration of the pomace so as to permit the extraction of wine product retained in the pomace without imparting undesirable compounds from the pomace to the wine product.

During fermentation of wine, the remains of grape skin and vine material, known as pomace, settles to the bottom of the fermentation tank forming a thick, fibrous sludge. After the fermented wine is drained from the fermentation tank leaving the pomace in the tank, a significant amount of fermented wine is retained within the pomace. The pomace is discarded; however, recovery of the retained fermented wine is economically desirable. Recovering the retained wine from the pomace has long presented the wine industry with difficulties as undesirable compounds are typically released from the pomace and departed to the wine tainting the wine in an undesirable manner when the pomace is mechanically disturbed. Prior to the present invention, mechanical processes to remove the pomace typically macerate the pomace thus releasing the undesirable compounds. The present invention minimizes the mechanical disturbance to the wine pomace therefore also minimizing the release of the undesirable compounds.

Prior to the present invention, many manual and mechanically assisted techniques have been employed to remove pomace from the fermentation tank. The principal mechanically assisted technique for pomace extraction is the use of pressurized fermented wine hosed into the pomace so as to suspend the pomace fragments in the wine thereby permitting the flushing of the mixture of wine and pomace from the tank. The mixture is pumped and filleted to a wine press where the wine is squeezed from the mixture. This flushing and pumping technique sufficiently disturbs the pomace to release unacceptable amounts of undesirable compounds into the wine.

More typically, pomace is removed manually by shoveling. Fermentation tanks are typically cylindrically shaped closed tanks with an entry portal on the side of the tank tangent to the bottom. The bottom of the tank is typically shallowly pitched towards the entry portal so as to assist the drainage. After fermentation, the pomace forms a 3 to 5 foot matting in the bottom of the tank, usually covering the entry portal. Typically, and most commonly, a worker opens the entry portal, exposing wine pomace settled against the entry portal. Using a shovel or similar implement, the worker digs into the impacted pomace until an entry path can be made into the fermentation tank. The worker then enters the fermentation tank through the entry portal. The pomace is removed by shoveling the pomace along with the remaining retained wine through the entry portal and transferring the material into receptacles for subsequent draining and pressing. Gravity draining and light pressing of the fermented wine from the manually removed pomace typically imparts acceptably low levels of undesirable compounds to the fermented wine. This shoveling extraction process is labor intensive, time consuming and raises safety issues for the worker.

As manual removal of pomace requires a worker to enter a closed tank, $CO_2$ asphyxiation during pomace removal is not uncommon in the industry. $CO_2$ is a byproduct of the fermentation process and continues to be generated by fermentation within the pomace.

There has been a need for an apparatus and method to remove the wine retaining pomace that avoids these disadvantages. The present invention fulfills this need, and further provides related advantages.

SUMMARY OF THE INVENTION

Accordingly, the present invention is directed to wine manufacturing apparatuses and methods for removing wine pomace or any matter of similar properties from production tanks and, more specifically, for the automated removal of wine pomace from fermentation tanks in such a manner so as to minimize the maceration of the pomace, thereby minimizing the release of undesirable compounds from the pomace, and reduce the time and labor associated with pomace removal, thereby substantially obviating one or more of the problems due to the limitations and disadvantages of the related art.

The present invention is an apparatus and method for removal of wine pomace generally comprising a support cart, a conveyor means, and mechanical sweeper is removably insertable into an industry standard cylindrically shaped fermentation tank with an entry portal on the vertical side of the tank and near or at the bottom of the tank. The conveyor means is so engineered as to fit into an open entry portal and transport pomace from the tank to a receiver bin. Mechanical sweeper is deployed to sweep pomace material into the path of the conveyor means. The mechanical sweeper in the preferred embodiment has sweeper wings extending radially and parallel with the bottom of the tank from the conveying means and are in contact with the tank bottom. The sweeper wings are so attached and pivotally hinged to the conveyor means so as to permit the sweeper wings to sweep pomace material towards the conveyor means. The sweeper wings are further positioned to permit the wings to sweep through an arc pivoting from the center or near the center of the tank and radially extending to the perimeter of the tank, thus allowing a sweeper wing to sweep through a chord along the tank perimeter pushing pomace towards the conveyor. The sweeper wings have adjustable lengths so as to accommodate various diameters of tanks. Pomace material is therefore swept from the tank floor into the collection path of the conveyor means. Pomace is transported to a receiver bin located under in the support cart located on the exterior of the tank.

An objective of the invention is to minimize the maceration of the pomace. Experiments have shown that the mechanical action imparted to the pomace by the conveyor cleats and the sweeper wings is similar in nature to that imparted by shoveling resulting in minimal maceration.

A further objective of the invention is to reduce the labor requirements for pomace removal. The present invention has been shown to significantly reduce the manual labor by eliminating the need for a worker to manually shovel pomace from the tank. Further the amount of time required to empty a tank is considerably reduced.

An additional objective of the invention is to improve the safety related issues of pomace removal. Because application of the present invention does not require the entry of a worker into the tank, disadvantages of the prior art are clearly demonstratable.

The consistency of the remaining wine pomace varies depending upon the wine making process. The wine pomace consistency varies from a wet sludge to a firm matting, not dissimilar to peat. The wine pomace consistency may also vary with the length of time the wine pomace is left standing in the tank. Therefore a further objective of the present invention is to provide a means for extracting pomace of various consistencies.

BRIEF DESCRIPTION OF THE DRAWINGS

The accompanying drawings, which are incorporated in and constitute a part of this specification illustrate embodiments of the invention and, together with the description, serve to explain the features, advantages, and principles of the invention.

In the drawings:

FIG. 1A is a perspective view of an embodiment of the wine pomace extraction apparatus constructed in accordance with this invention when arranged so as to clearly illustrate the components of the invention.

FIG. 1 is a right-side elevation view of an embodiment of the pomace extraction apparatus constructed in accordance with this invention when arranged in the transport configuration.

FIG. 2 is an enlarged, sectional view taken along line 2-2 of FIG. 1.

FIG. 3 is a top plan view of the invention shown in FIG. 1.

FIG. 4 is a front elevation view taken along line 4-4 of FIG. 1.

FIG. 5 is a rear elevation view of the sweeper wing activation subsystem of the invention illustrating the activating hydraulic cylinders, cables and guide pulleys.

DETAILED DESCRIPTION OF THE PREFERRED EMBODIMENT

Figure 6:
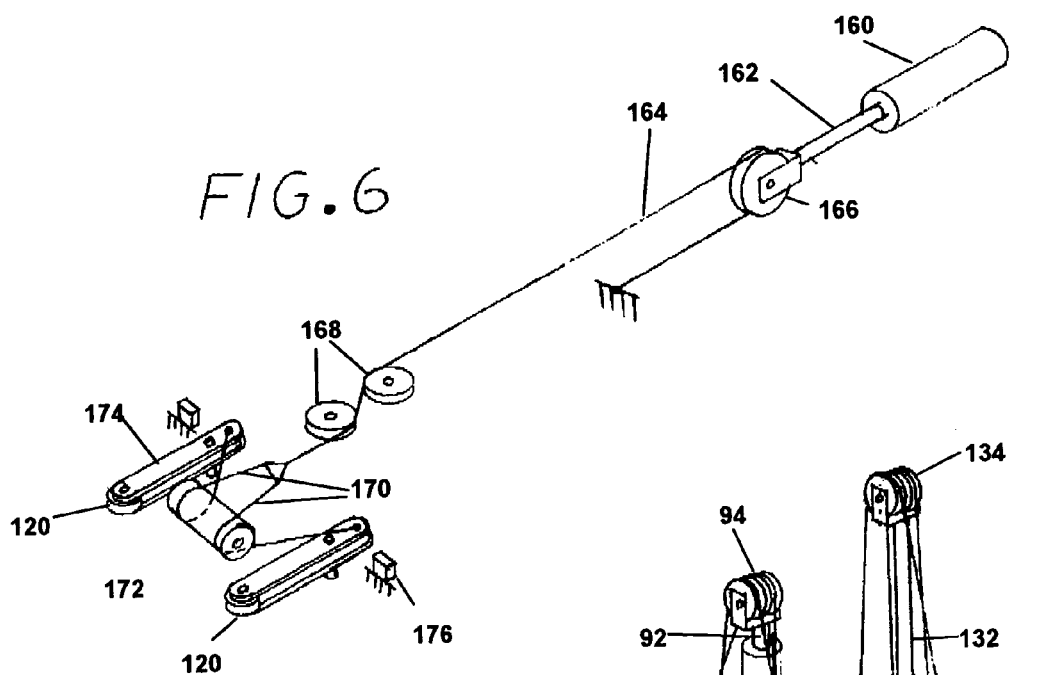
FIG. 6 is a perspective view of the winglet pulley deployment subsystem.

Although particular embodiments of the invention have been described in detail for purposes of illustration, various modifications may be made without departing from the spirit and scope of the invention. Accordingly, the invention is not to be limited except as by the appended claims. Referring now in greater detail to the various figures of the drawing wherein like reference characters refer to like parts, there is shown at 20 in FIG. 1A, wine pomace extraction apparatus constructed in accordance with the subject invention. Before describing the details of that apparatus it must be pointed out that while the apparatus is particularly suited for affecting wine pomace removal, it can also be used of other material extraction as well. Moreover, the subject invention can even be used for non-wine making applications wherein extraction of material from tanks is desired, such as grain removal from a silo.

A preferred embodiment of the instant invention is illustrated in FIGS. 1A, 1-14. FIGS. 8-14 are directed to various arrangements of the invention to more particularly illustrate corresponding steps in the method of use of the invention.

Figure 15:
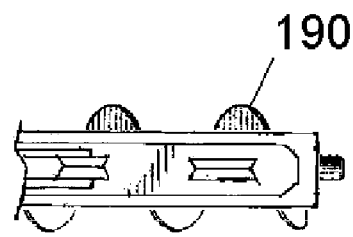
FIG. 15 is an inset side elevation view of the invention, as in FIG. 1A, showing the alternate embodiment of the conveyor means being a screw type conveyor.
Figure 16:
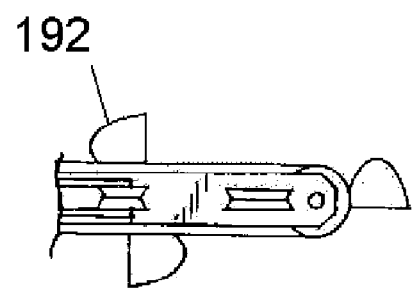
FIG. 16 is an inset side elevation view of the invention, as in FIG. 1A, showing the alternate embodiment of the conveyor means being a bucket type conveyor.
Figure 17:
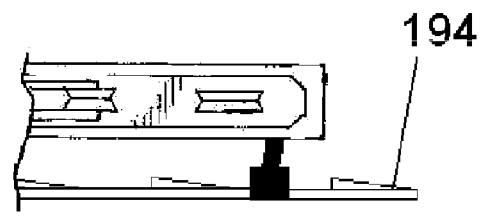
FIG. 17 is an inset side elevation view of the invention, as in FIG. 1A, showing the alternate embodiment of the conveyor means being a vibrating bed type conveyor.

FIG. 1A is an overall perspective view of the apparatus 20, showing the major subsystems and their spatial relationship. Referring to FIG. 1A, the preferred embodiment of the wine pomace extraction apparatus 20 comprises a support cart 22, a belt conveyor 24 as the conveyor means, and mechanical sweeper 26. Other embodiments of the invention may utilize other conveyor means including, but not limited to screw type 190, as in FIG. 15, bucket type 192, as in FIG. 16, or vibrating bed type 194, as in FIG. 17.

As shown in FIG. 1, a right-side elevation view of a preferred embodiment, support cart 22 comprises a generally horizontal rectangular frame having forward legs 40 of adjustable length as a pair attached to the frame and rear legs 44 of adjustable length as a pair also attached to the frame. The length of the forward legs 40 is adjusted by means of hydraulic cylinder 42. The length of the rear legs 44 is independently adjusted by means of second hydraulic cylinder 46. Both front and rear legs have wheels 66 to aid maneuvering the apparatus.

The support cart has a forward end and a rear end wherein the forward end is capable of mounting to a tank entry portal by means of docking plate 60 (FIG. 1) that is pivotally attached to the forward end of the cart at the pivotal attachment points 64. Draw latches 62 mounted to the docking plate are used to securely lock the docking plate to a tank entry portal.

The support cart has a hydraulic pressure system 48 (FIG. 1) mounted near the rear end of the support cart that activates all the hydraulically driven devices on the apparatus. The hydraulic pressure system contains pumps, controls, sensors, and reservoirs necessary for activating the respective devices utilizing appropriate control technology, which may, for example, include standard pressure limiters, pressure release valves, load sensors and appropriate hosing and coupling of which will be readily familiar to those familiar with hydraulic systems. Flexible hose tray 50 (FIG.

1) routes hydraulic hoses and required electrical cables from the hydraulic pressure system to the conveyor.

FIG. 2, a forward looking sectional view of the support cart 22 and belt conveyor 24 along line 2-2 of FIG. 1, clearly shows slide rails 30 attached to the support cart frame. These slide rails are so engineered as to accommodate and entrain support brackets 32 attached to the conveyor thus permitting forward and reverse motion of the conveyor relative to the frame. Extend-retract hydraulic motor 34 (FIG. 1) is affixed to the support cart frame so as to drive a pinion gear engaged in gear rack 36 (FIG. 3) wherein gear rack 36 is secured to the conveyor. The motor together with the rack and pinion is used to propel the conveyor back and forth relative to the cart frame through the slide rails 30. Further, the characteristics of a hydraulic motor permit accurate relative positioning of the support cart and conveyor; and the ability to lock the conveyor at a particular position. Being hydraulic the motor is powered and controlled from the hydraulic pressure system 48 (FIG. 1).

Belt conveyor 24 is shown mounted in the slide rails of the support cart in FIG. 4, a front elevation view of the apparatus taken along line 4-4 of FIG. 1, and FIG. 3, a top plan view of the apparatus also as shown in FIG. 1. Belt conveyor 24 having a proximal end and a distal end and having a longitudinal axis, comprises conveyor frame, conveyor belt 52 (FIG. 2) propelled by conveyor drive motor 56 (FIG. 3), a plurality of cleats 54 (FIG. 2) secured at intervals to stand perpendicular to the conveyor belt, and supports for components of the mechanical sweeper wings 26 (FIG. 1A). The distal end of the conveyor protrudes from the forward end of the support cart. Conveyor drive motor 56 (FIG. 3) is preferably a hydraulic motor to be powered and controlled from the hydraulic pressure system 48 (FIG. 1).

Figure 7:
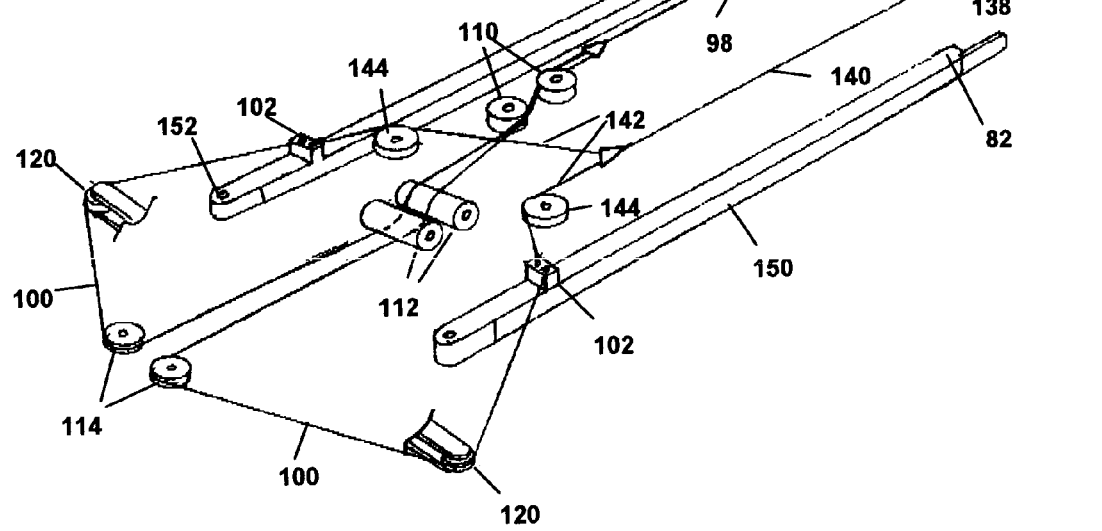
FIG. 7 is a perspective view of the sweeper wing activation subsystem.

The mechanical sweeper, mounted to the conveyor, has sweeper wings and a sweeper wing activation system as in FIG. 5 and FIG. 7. The mechanical sweeper further has winglet pulleys and a winglet pulley deployment systems as in FIG. 6.

In the internal mechanism of the sweeper wing activation system according to FIG. 7, two cable mechanisms exist to activate sweeper wings 82, one being for the purpose of deploying the wings while the other is for the purpose of retracting the wings. Fixed hydraulic cylinders having a moveable power arm which extends when the cylinder is pressurized. The cylinders are preferably a single acting hydraulic cylinder and will be powered from hydraulic pressure system 48 (FIG. 1).

As in FIG. 7, the sweeper wings are deployed by activating fixed deployment hydraulic cylinder 90 positioned on the conveyor frame wherein the moveable power arm 92 is connected to a double pulley 94 that moves vertically along pulley guide 96 (FIG. 5) when the hydraulic cylinder 90 is pressurized. The extending motion of the arm 92 has a tightening effect on deployment cable 98 extending from proximal end of the conveyor to left and right remote deployment cables 100 which in turn extend to both the sweeper wing cable attachment brackets 102. The deployment cable 98 is attached to the conveyor frame by means of a cable turnbuckle 104 fixed to the frame. The deployment cable is guided through the double pulley 94 to free pulley 106 fixed to the conveyor frame and returned again to the double pulley 94 for purposes of reducing the stroke length of the moveable power arm required to deploy the sweeper wing. The deployment cable 98 is further guided by second free pulley 108 also fixed to the conveyor frame to align the cable path in the longitudinal direction of the conveyor. Because the deployment cable activates both sweeper wings simultaneously, the cable is attached to a left and a right remote deployment cable 100 respectively extending to the left and right sweeper wings 82. The left and right remote deployment cables are both guided through free pulleys 110 and then to rollers 112 used to align the remote deployment cables centrally within conveyor. The remote deployment cables 100 are subsequently guided to remote free pulleys 114 so as to arrange a pulling action of the deployment cables in a direction towards the distal end of the conveyor thereby affecting the deploying motion of the sweeper wings. Observing that when the sweeper wing is positioned against the conveyor, a pulling action of the remote deployment cables towards the distal end of the conveyor the pulling action will not deploy the wings, the remote deployment cables are additionally guided over a deployable winglet pulleys 120 for the purposes of changing the direction of the pulling action of the deployment cables in a direction away from the conveyor and also towards the distal end of the conveyor. The remote deployment cables are attached to the sweeper wings by cable attachment brackets 102 fixed to the sweeper wings.

The sweeper wings are retracted, according to FIG. 7, in a substantially similar manner to the deployment. The wings are retracted by activating fixed retraction hydraulic cylinder 130 positioned on the support cart, moveable power arm 132, double pulley 134, free pulley 136, and second free pulley 138 with a retraction cable 140 similarly attached to the conveyor frame by means of a cable turnbuckle. The retraction cable is also guided longitudinally along the conveyor and subsequently attached to two remote retraction cables 142. Departing from the wing deployment design, the two remote retraction cables 142 are guided over retraction pulleys 144 attached to the conveyor so as to arrange a pulling action of the retraction cables in a direction inwardly towards the conveyor thereby affecting the retracting motion of the sweeper wings. Observing that when the sweeper wings are located in a fully extended position, a pulling action of the remote deployment cables inwardly towards the conveyor, the remote retraction cables are additionally guided over deployable winglet pulleys 120 for purposes of changing the direction of the pulling action of the retraction cables in a direction away from the conveyor and also inwardly toward the conveyor. The remote retraction cables are attached to the sweeper wings by cable attachment brackets 102 fixed to the sweeper wings.

A back and forth sweeping motion of the sweeper wings is thereby effected by first releasing the pressure on the sweeper wing retraction hydraulic cylinder 130 and subsequently pressurizing the sweeper wing deployment hydraulic cylinder 90 resulting in the sweeper wings to pivot outwardly from the conveyor until fully extended. The return motion is next accomplished by first releasing the pressure on the sweeper wing deployment hydraulic cylinder 90, and subsequently pressurizing the sweeper wing retraction hydraulic cylinder 130 thereby moving the sweeper wings back towards the conveyor and their rest position.

Each sweeper wing further optionally has flap 150 (FIG. 7) extending the length of the sweeper, being hinged to sweeper wing arm and extending downwardly from the arm. The range of motion of flap hinge is restricted so as to permit the flap to hinge upwardly towards the sweeper wing arm when the wing is deploying. The flap hinges to a downward position when the wing is retracting thereby improving the efficiency of the sweeping action of the wings.

In the internal mechanism of the winglet pulley deployment system according to FIG. 6, a cable mechanism exists to deploy winglet pulleys 120 for the purposes of changing the direction of the pulling action of both the wing remote deployment and retraction cables by means of adjusting the guide path of the cables. The winglet pulleys are deployable to permit the pulleys to be stowed within the conveyor thus minimizing the width of the conveyor so as not to be obstructed by the entry portal during insertion into the tank. The winglet pulley deployment fixed hydraulic cylinder 160 having a moveable power arm 162 which retracts when the cylinder is pressurized. The cylinder is preferably a single acting hydraulic cylinder and will be powered from the hydraulic pressure system.

In FIG. 6, winglet deployment cable 164 is attached to the conveyor and guided through a first pulley 166 attached to the movable arm on the winglet hydraulic cylinder. The winglet deployment cable is subsequently guided over free pulleys 168 so as to align the cable with the horizontal center of conveyor and as not to interfere with the sweeper wing cables. The winglet deployment cable is attached to a left and a right remote winglet deployment cable 170. The remote cables are each guided over roller 172 so as to align the cables with the vertical center of the conveyor and are respectively attached to winglet arms 174. The winglet arms having a proximal and distal end are pivotally attached to the conveyor. The pivotal attachment point to the conveyor is near the proximal end to which the remote cable is attached. Winglet pulley 120 is attached to the distal end of the arm.

Pressurizing the winglet hydraulic cylinder effects a pulling action on the winglet deployment cable thereby forcing the winglet arms to pivot out and are stopped in position perpendicular to the conveyor by winglet arm stop 176. The sweeper wing deployment and retraction cables are subsequently guided over the winglet pulley.

During sweeper wing deployment the sweeper wing deployment cables are guided by the winglet pulleys 120 until the sweeper wing is pivoted to a position tangent to the conveyor. As the sweeper wing cable attachment bracket is positioned at a location on the wing further distal from the conveyor than is the winglet pulley, once the sweeper wing pivots past the winglet pulley, the deployment cable is no longer guided by the winglet pulley. Instead, the sweeper wing retraction cable is now guided by the winglet pulley while the wing is positioned beyond the tangent position through to the fully extended position.

The method of extraction of the wine pomace from the wine fermentation tank generally comprises the following steps of draining the fermented wine from the tank leaving the wine pomace settled in the bottom of the tank, opening the tank entry portal, preparing the tank entry portal for receiving the apparatus, maneuvering the apparatus into position into the entry portal, docking the apparatus with the entry portal, inserting conveyor, deploying winglet pulleys, deploying sweeper wings and sweeping pomace with sweeper wings into the collection path of the conveyor.

With the tank drained with the wine pomace settled, receiver bin 80 is placed below the tank entry portal, collection shoot 180 (FIG. 8) is secured to the entry portal. Pomace is manually shoveled into the receiver bin until a small tunnel is formed in the pomace so as to accommodate the distal end of the conveyor with the conveyor fully retracted into the support cart. The now partially filled receiver bin is removed. The apparatus is maneuvered into position in front of the opened entry portal according to FIG. 1 with the conveyor fully retracted into the support cart. The forward legs and rear legs of the support cart are adjusted so that docking plate aligns with the entry portal. Latches are next secured to the entry portal securing the entire apparatus to the tank 76. A receiver bin is placed under the support cart.

Figure 8:
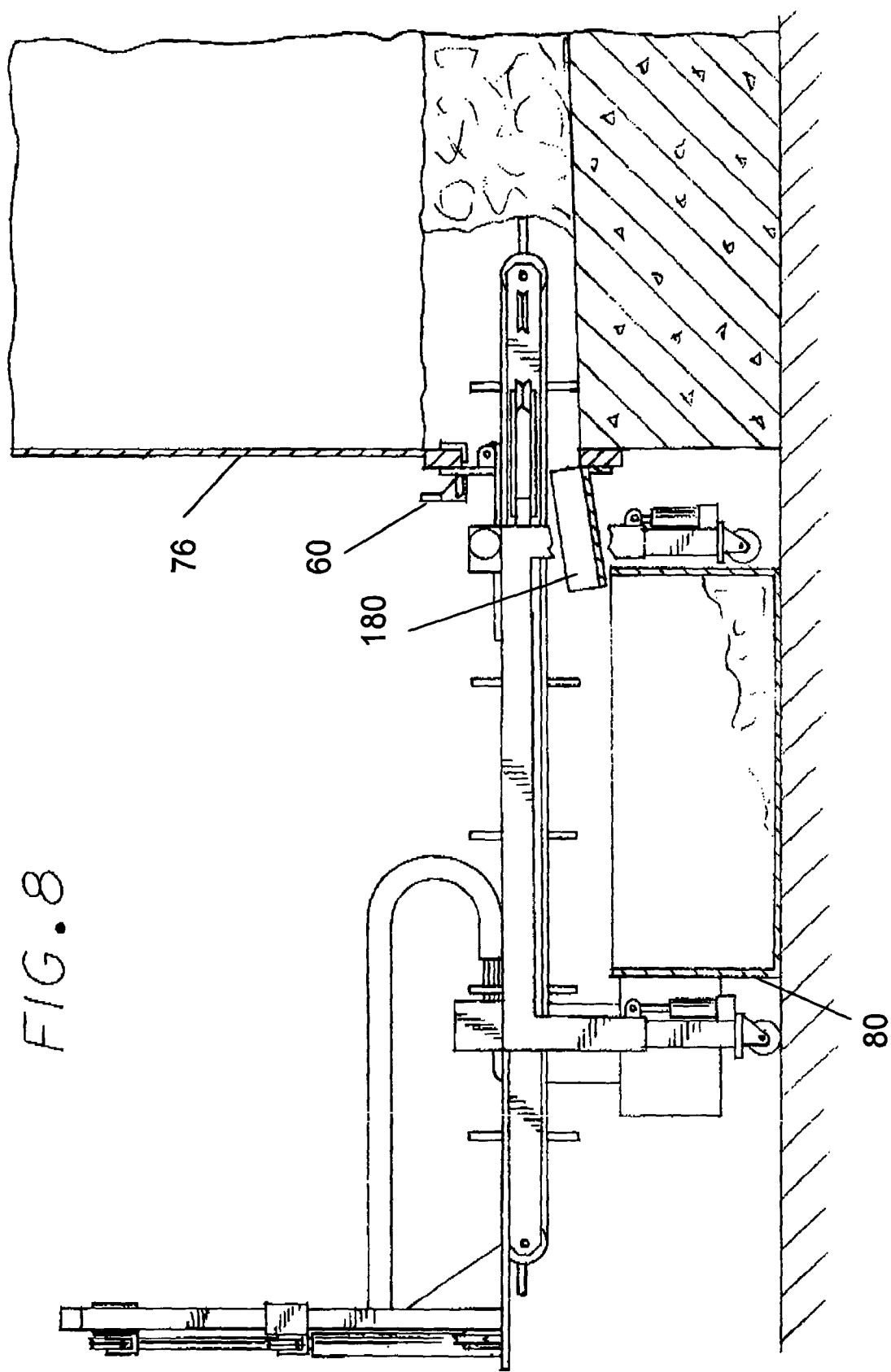
FIG. 8 is a right-side elevation view of the invention arranged as mounted to a pomace filled tank.

With docking plate 60 secured to the entry portal, the length of the forward legs 40 of the support cart is shortened so as to lift the legs off the ground as in FIG. 8.

Figure 9:
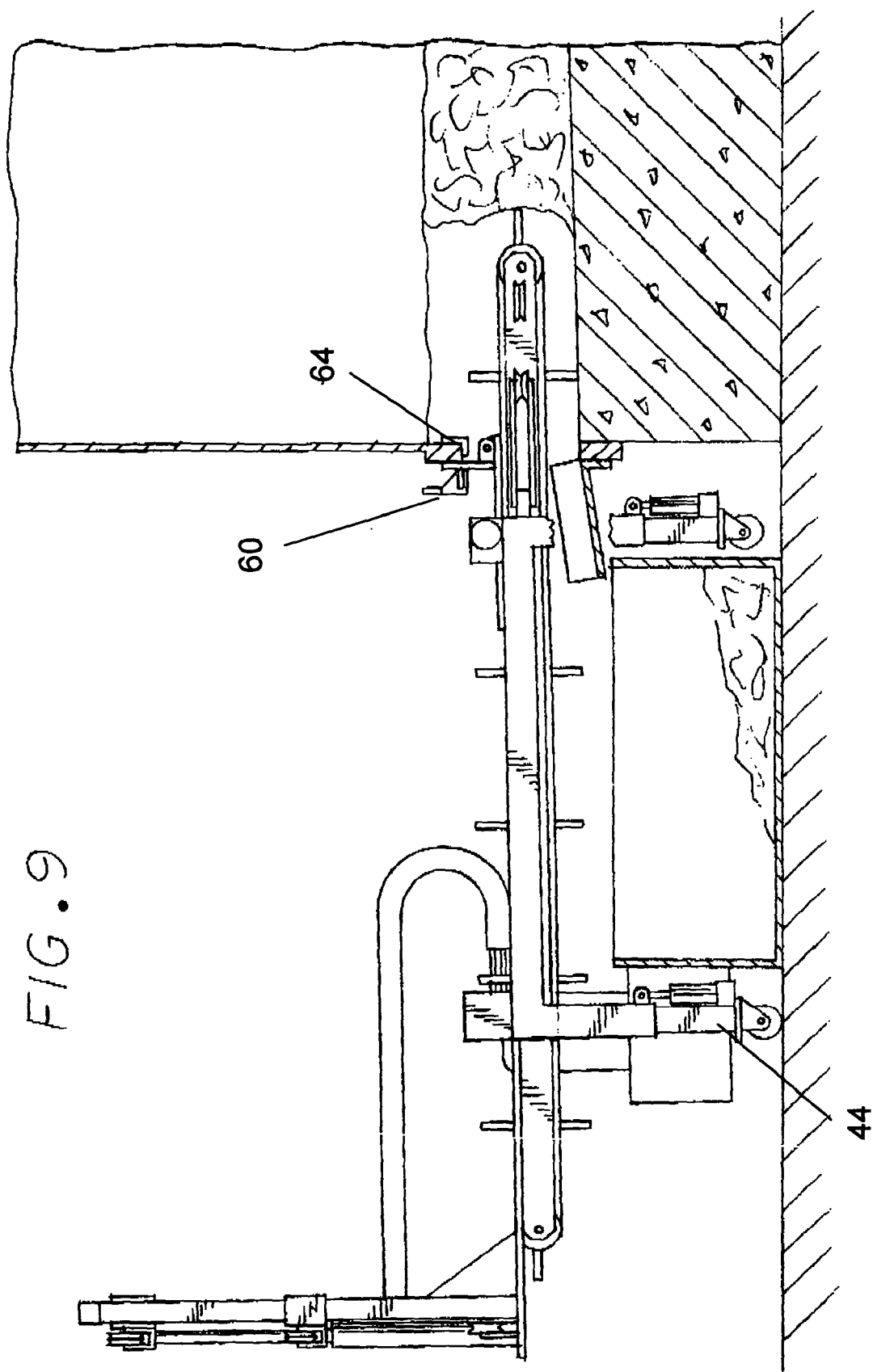
FIG. 9 is a right-side elevation view of the invention arranged in the initial docked position as mounted to a pomace filled tank with rear support cart legs adjusted to match the pitch of the conveyor with the pitch of the tank floor.

The floor of the fermentation tank being typically pitched towards the entry portal and tangent to the bottom of the entry portal, requires the distal end of the conveyor to be gradually raised upwardly so that the pitch of the conveyor matches the pitch of the tank floor resulting in the conveyor being parallel to the tank floor. As docking plate 60 is pivotally attached to the vertical sides of the support cart permitting adjustment of the longitudinal axis of the conveyor relative to the pitch of floor of the tank by means of adjusting the height of the rear legs 44 of the support cart. In FIG. 9, rear 44 legs have been shortened, pivoting the apparatus around the docking plate attachment points 64, until the distal end of the conveyor has moved upwards such that the conveyor is parallel to the tank floor. The apparatus now so arranged with the conveyor fully retracted, and as in FIG. 9, is in the initial docked position.

Figure 10:
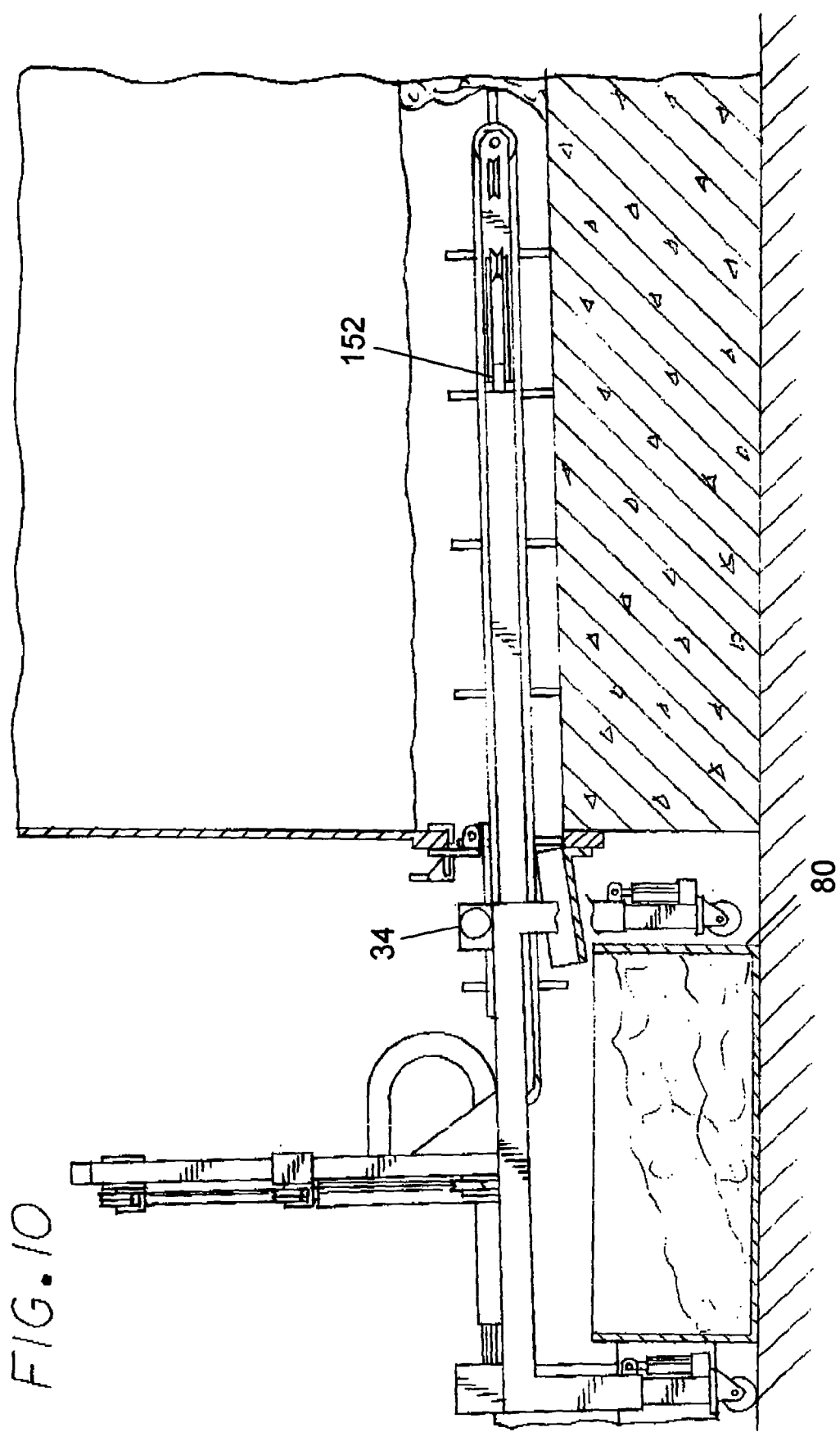
FIG. 10 is a right-side elevation view of the invention arranged in the fully extended position as mounted to a pomace filled tank.

Referring to FIG. 10, the conveyor drive motor 56 is activated in such a manner as the upwardly facing portion of the conveyor belt moves inwardly towards the tank interior thereby pulling conveyor cleats attached to the conveyor belt and presently downwardly positioned back towards the support cart. The conveyor is next slowly extended inwardly into the tank 76 by activating extend-retract hydraulic motor 34 thereby sliding longitudinally the conveyor forward relative to the support cart until the sweeper wing pivotal attachment points 152 are aligned with the center of the tank bottom as shown in FIG. 10, a position known as the fully extended position. The conveyor drive motor remains activated thereby extracting pomace until receiver bin 80 is filled. A filled receiver bin is replaced with an empty receiver bin by the operator.

Figure 11:
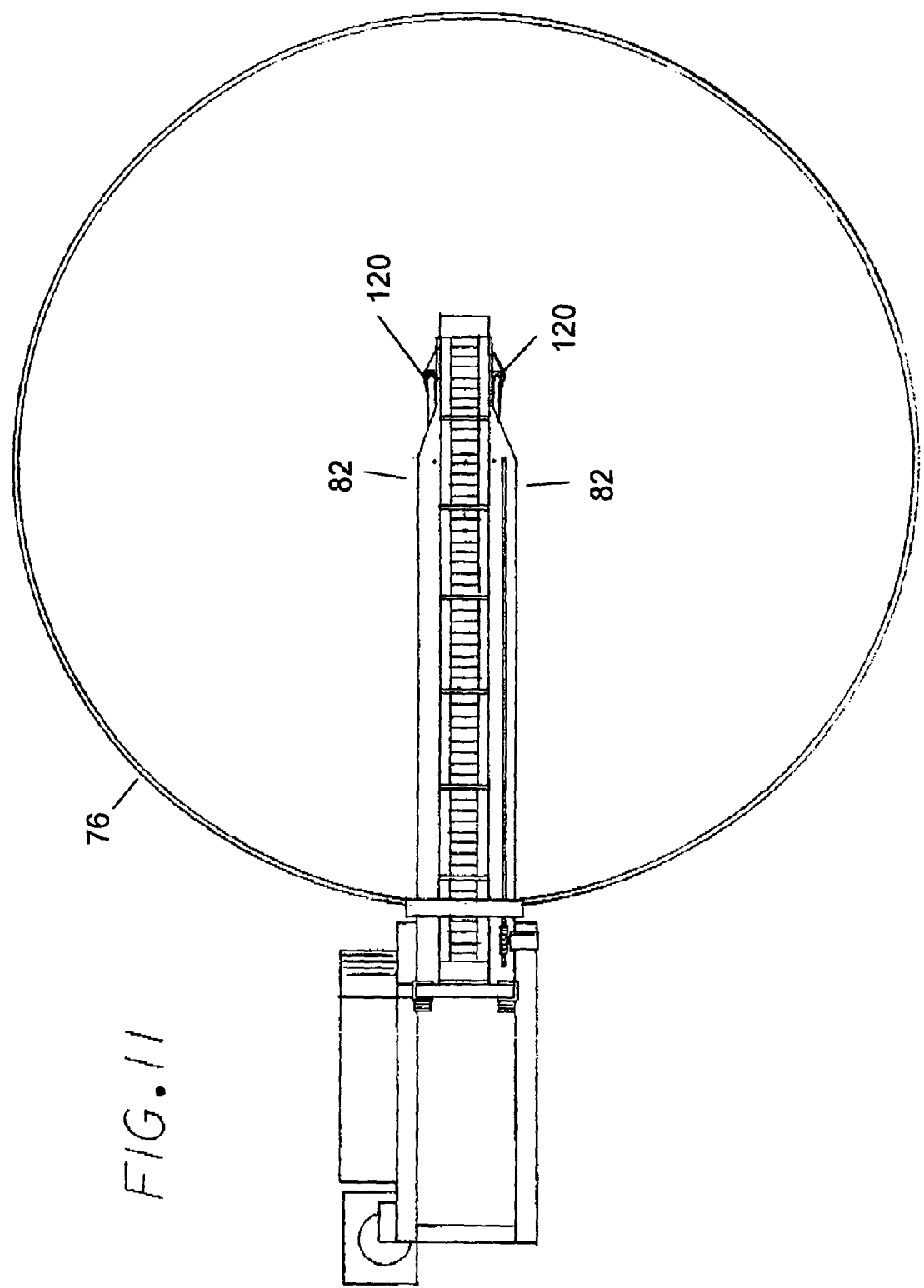
FIG. 11 is a top plan view of the invention, as in FIG. 10, arranged in the fully extended position as mounted to a pomace filled tank illustrating the fully inserted conveyor prior to deployment of the winglet pulleys.
Figure 12:
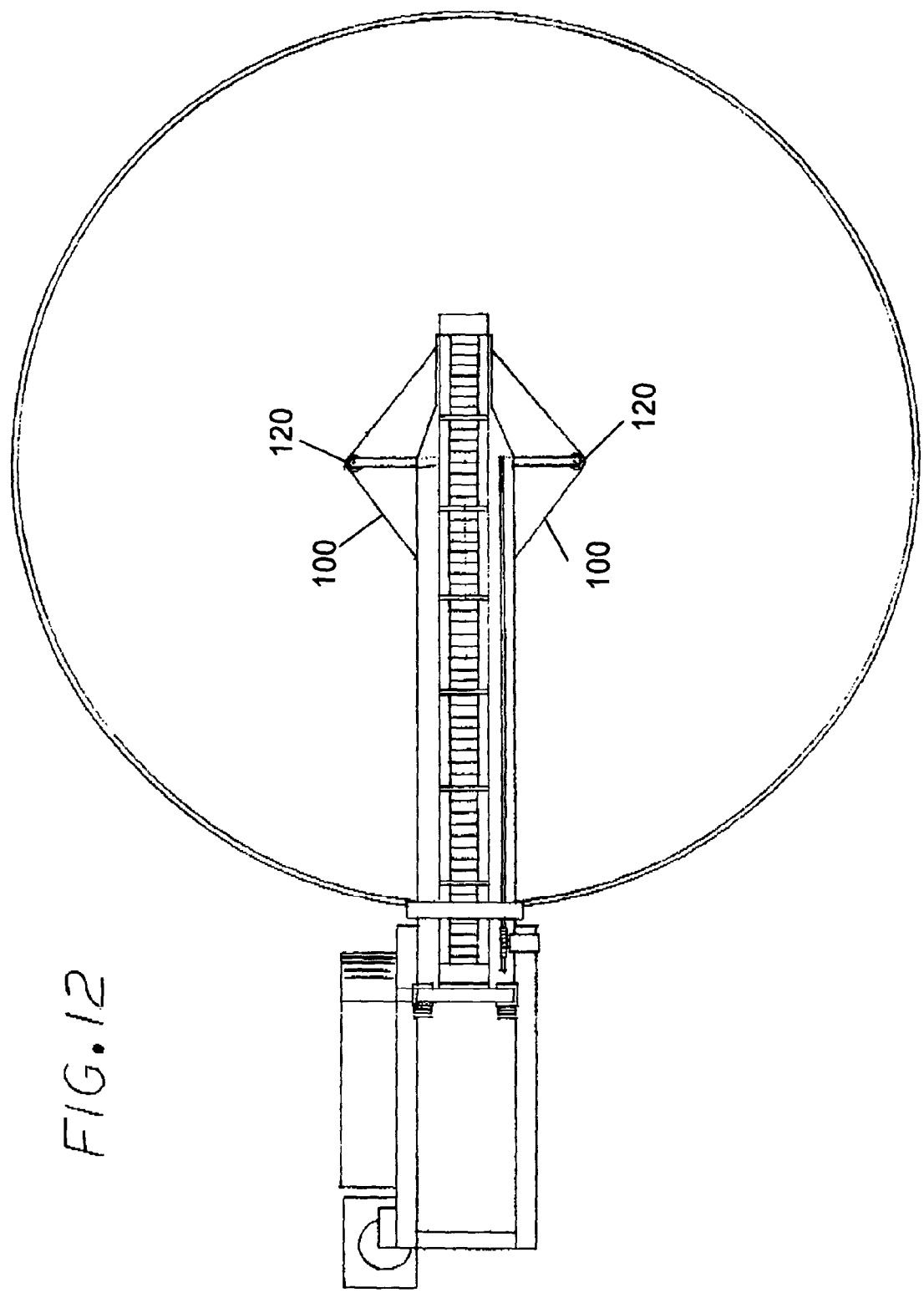
FIG. 12 is a top plan view of the invention, as in FIG. 11, further illustrating the winglet pulleys in the fully deployed position.
Figure 13:
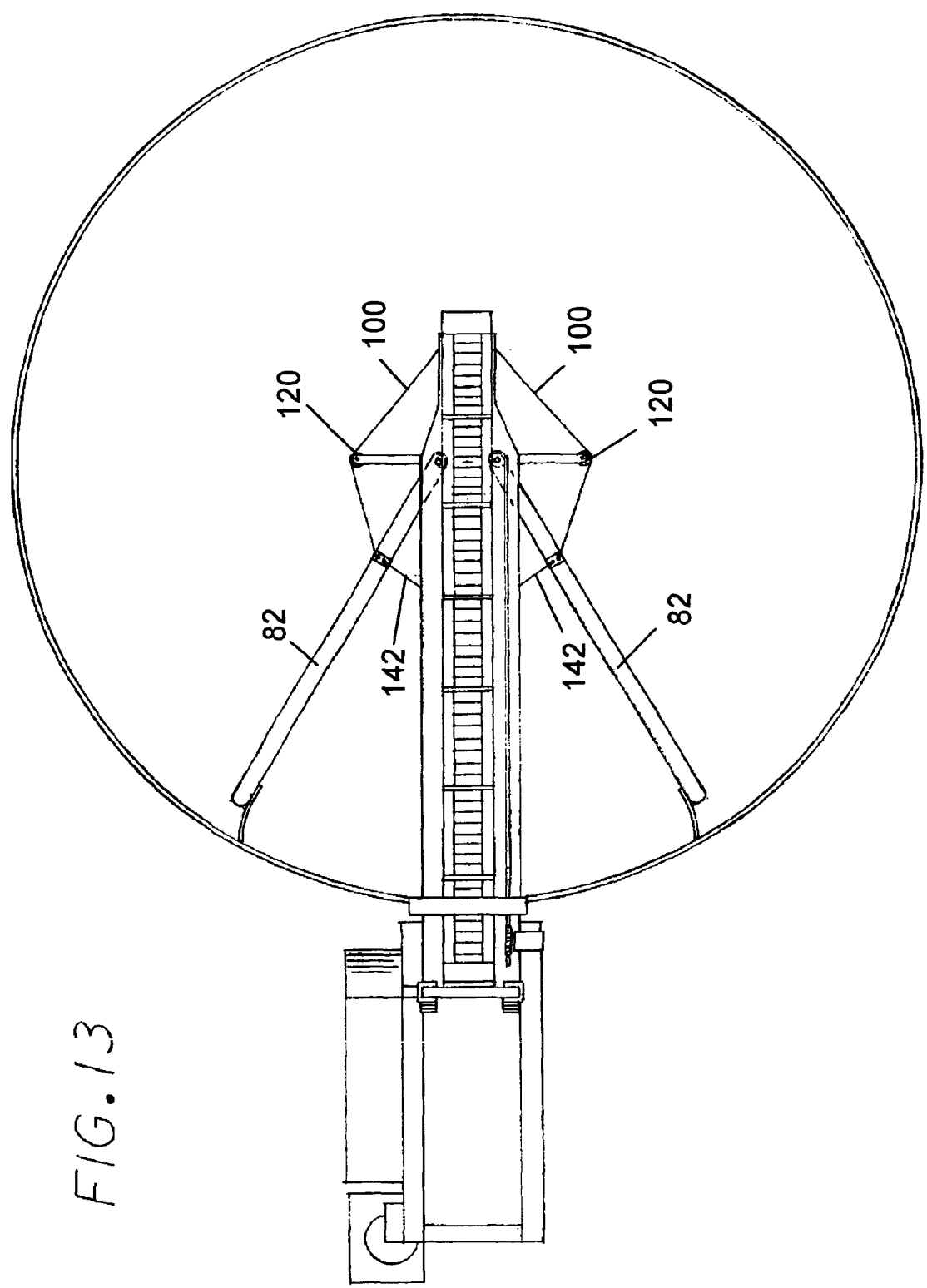
FIG. 13 is a top plan view of the invention, as in FIG. 12, further illustrating the sweeper wings in an activated position.
Figure 14:
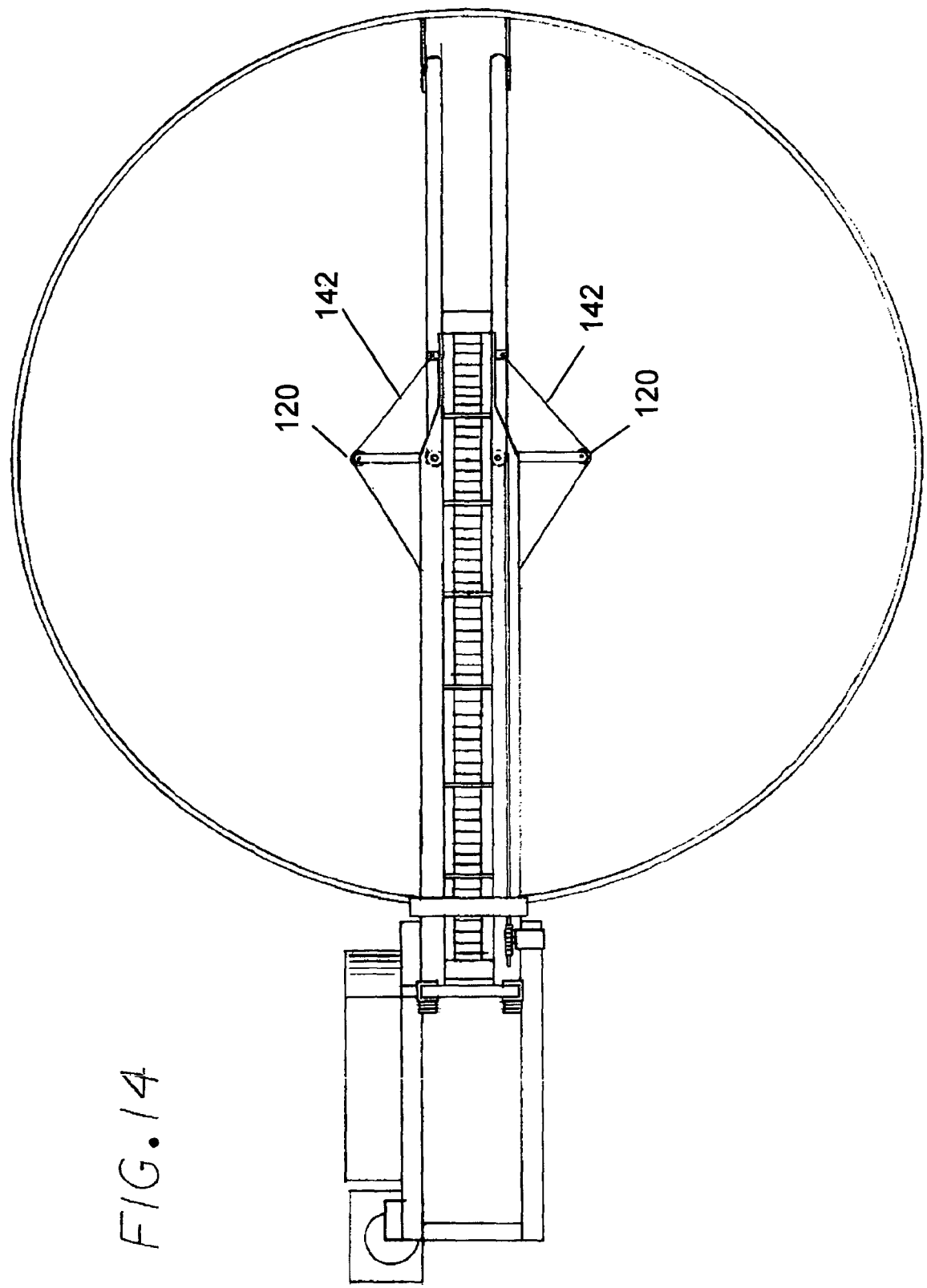
FIG. 14 is a top plan view of the invention, as in FIG. 13, alternatively illustrating the sweeper wings in the forward extended position.

The conveyor is operated in this manner in the fully extended position until pomace extraction slows indicating that the bulk of the pomace reachable by the conveyor has been extracted. Pomace remaining in the tank forms piles of material on either side and in front of the conveyor. The mechanical sweeper wings are next activated to sweep remaining pomace into the collection path of the conveyor. In FIG. 11, a top plan view of the embodiment in the fully extended position, shows winglet pulleys 120 and sweeper wings 82 both in the respective rest positions against the conveyor. In FIG. 12, winglet pulleys 120 are shown deployed thereby exposing the sweeper wing remote deployment cables 100. Sweeper wings remain in the rest position. Next, according to FIG. 13, sweeper wings 82 are activated and pulled outwardly from the conveyor. FIG. 13 illustrates activated sweeper wings 82 exposing wing remote retraction cables 142, wing deployment cables 100 and winglet pulleys 120. The sweeper wings are deployed until the wings are moved to the fully extended position illustrated in FIG. 14. Sweeper wing retraction cables 142 are now exposed and are shown being guided by the winglet pulleys 120.

The sweeper wings are activated from the rest to fully extended position and back to the rest position until remaining pomace is guided into the collection path of the conveyor and transported to the receiver bin.

After pomace extraction is complete, the apparatus is removed from the tank by the steps of returning the mechanical sweeper wings to their rest position, returning the winglet pulleys to their rest position, deactivating the conveyor drive motor, retracting the conveyor back into the support cart, lengthening the front legs so as to touch the ground, unlatching the docking plate and maneuvering the apparatus away from the tank.

What is claimed is:

1. A wine pomace extraction apparatus for the purpose of removing the residue of wine fermentation known as pomace from a fermentation tank and generally for extracting material from tanks, comprising
   a support cart having a front end and a rear end, a substantially horizontal rectangular frame having forward legs and rear legs,
   a conveyor means having a proximal end, a distal end, collection path, and a longitudinal axis suitable for transporting pomace to a receiver bin, said conveyor means is mounted to said frame of support cart, said conveyor means so engineered as to permit insertion of said distal end into an entry portal of a tank and said proximal end positioned over said receiver bin, and
   a mechanical sweeper comprising at least one wing pivotally hinged to said conveyor means, extending radially from said conveyor means, and positioned on the conveyor means to sweep through an arc whereby said sweeper guides pomace to the conveyor means collection path.

2. A wine pomace extraction apparatus for the purpose of removing the residue of wine fermentation known as pomace from a fermentation tank and generally for extracting material from tanks, comprising
   a support cart having a front end and a rear end, a substantially horizontal rectangular frame having forward legs, rear legs, a docking plate attached to said front end, wherein in said docking plate has latches for securing to an entry portal of a fermentation tank, and a hydraulic pressure system for providing power and control,
   a conveyor means having a proximal end, a distal end, a width, sides, collection path, and a longitudinal axis suitable for transporting pomace, said conveyor means is mounted to said frame of support cart so as to permit said conveyor means to move and be positioned longitudinally with respect to said frame of said support cart with said distal end protruding from said forward end of said support cart and said proximal end positioned to deliver transported pomace to a receiver bin, said conveyor means powered by said hydraulic pressure system, said conveyor means width so engineered as to permit insertion into said entry portal, and
   a mechanical sweeper mounted to said conveyor means whereby sweeper guides pomace to the conveyor means collection path when activated and retracted against said conveyor means when not activated, said mechanical sweeper powered by said hydraulic pressure system.

3. The wine pomace extraction apparatus according to claim 2 wherein said forward legs and rear legs have adjustable length.

4. The wine pomace extraction apparatus according to claim 2 wherein said docking plate is pivotally attached to said front end of said support chart.

5. The wine pomace extraction apparatus according to claim 2 wherein said conveyor means is a belt conveyor having a frame supporting a longitudinally positioned conveyor belt having a plurality of cleats secured at intervals to stand perpendicular to said belt, and a hydraulic drive motor suitable to propel said conveyor belt.

6. The wine pomace extraction apparatus according to claim 2 wherein said mechanical sweeper comprises sweeper wings having arms of length approximate to the radius of said tank, each pivotally attached to said conveyor means at locations, with sweeper wings attached to the sides of said conveyor means, so as to permit said sweeper wings to move through an arc pivoting near the center of said tank and radially extending to the perimeter of said tank, at least one sweeper wing mounted to each side of said conveyor means, said sweeper wings being positioned by hydraulically powered cables, said cables guided by pulleys also attached to the conveyor means whereby said sweeper wings guide pomace to the conveyor means.

7. The wine pomace extraction apparatus according to claim 6 wherein said mechanical sweeper further comprises winglet arms having proximal and distal ends, pivotally attached at said proximal end to said conveyor means and having a guide pulley attached to said distal end, said winglet arms deployable by pivoting said arms away from said conveyor means to a position to guide said sweeper wing cables.

8. The wine pomace extraction apparatus according to claim 6 wherein said sweeper wing further comprises a flap extending the length of said sweeper wing arm, being hinged to said arm and extending downwardly from said arm wherein the range of motion of said hinge is restricted so as to permit the flap to rotate upwardly towards said arm when said sweeper wing is deploying away from said conveyor means while restricted to a downward position when said sweeper wing is retracting towards said conveyor means thereby improving the efficiency of the sweeping action of said sweeper wings.

9. The wine pomace extraction apparatus according to claim 2 wherein wheels are attached to said support cart forward and rear legs thereby permitting the apparatus to be maneuvered into position.

10. The wine pomace extraction apparatus according to claim 2 wherein said conveyor means is powered by a hydraulic drive motor.

11. The wine pomace extraction apparatus according to claim 2 wherein said conveyor means is a screw conveyor.

12. The wine pomace extraction apparatus according to claim 2 wherein said conveyor means is a bucket conveyor.

13. The wine pomace extraction apparatus according to claim 2 wherein said conveyor means is a vibrating bed conveyor.

* * * * *